United States Patent
Li et al.

(10) Patent No.: US 9,923,365 B2
(45) Date of Patent: Mar. 20, 2018

(54) SHORT-CIRCUIT PROTECTION CIRCUIT FOR VOLTAGE SAMPLING RESISTOR OF PRIMARY SIDE CONVERTER

(71) Applicant: Wuxi Chipown Micro-electronics Limited, New District, Wuxi, Jiangsu (CN)

(72) Inventors: Haisong Li, Jiangsu (CN); Changshen Zhao, Jiangsu (CN); Yangbo Yi, Jiangsu (CN)

(73) Assignee: Wuxi Chipown Micro-Electronics Limited, Jiangsu (CN)

( * ) Notice: Subject to any disclaimer, the term of this patent is extended or adjusted under 35 U.S.C. 154(b) by 275 days.

(21) Appl. No.: 15/047,483

(22) Filed: Feb. 18, 2016

(65) Prior Publication Data

US 2017/0077695 A1    Mar. 16, 2017

(30) Foreign Application Priority Data

Sep. 15, 2015   (CN) .......................... 2015 1 0587599

(51) Int. Cl.
| | |
|---|---|
| *H02H 3/00* | (2006.01) |
| *H02H 7/12* | (2006.01) |
| *H02M 1/32* | (2007.01) |
| *H02H 7/125* | (2006.01) |
| *H02H 9/00* | (2006.01) |
| *H02M 1/36* | (2007.01) |

(52) U.S. Cl.
CPC .......... *H02H 7/1203* (2013.01); *H02M 1/32* (2013.01); *H02H 7/1213* (2013.01); *H02H 7/1252* (2013.01); *H02H 9/001* (2013.01); *H02M 1/36* (2013.01)

(58) Field of Classification Search
USPC ................................................ 361/18, 86–87
See application file for complete search history.

(56) References Cited

U.S. PATENT DOCUMENTS

| | | | | |
|---|---|---|---|---|
| 5,640,317 A | * | 6/1997 | Lei | .......................... H02M 1/36 363/49 |
| 2010/0259952 A1 | * | 10/2010 | Zhu | .......................... H02M 1/36 363/20 |

* cited by examiner

*Primary Examiner* — Danny Nguyen
(74) *Attorney, Agent, or Firm* — Munck Wilson Mandala LLP

(57) ABSTRACT

Disclosed is a short-circuit protection circuit for a voltage sampling resistor of a primary side converter, comprising a high voltage power transistor, a high voltage starting resistor, a first voltage dividing resistor of a port VDD, a second voltage dividing resistor of the port VDD, an NMOS transistor, a diode, a first comparator, a second comparator, a third comparator, a time delay circuit, a filter, a first logic circuit, a second logic circuit, a current supply, a first AND gate and a first inverter. The chip of the present disclosure is capable of correctly and effectively detecting whether the sampling resistor is shorted or not before the chip works normally, thereby avoiding the risk of damaging the chip by large current from the voltage feedback port FB due to turn-on of the switching transistor when the upper voltage sampling resistor is shorted, and greatly reducing the input power.

20 Claims, 4 Drawing Sheets

SHORT-CIRCUIT PROTECTION CIRCUIT FOR VOLTAGE SAMPLING RESISTOR OF PRIMARY SIDE CONVERTER

CROSS-REFERENCE TO RELATED APPLICATIONS

This application claims priority to and/or benefit from Chinese Application No. CN201510587599.8, filed on Sep. 15, 2015, entitled SHORT-CIRCUIT PROTECTION CIRCUIT FOR VOLTAGE SAMPLING RESISTOR OF PRIMARY SIDE CONVERTER, the specification of which is incorporated by reference herein in its entirety.

TECHNICAL FIELD

The present disclosure relates to a short-circuit protection circuit for a voltage sampling resistor of a primary side converter, and it belongs to the technical field of power semiconductors.

BACKGROUND

At present, a traditional switching power supply detects whether the feedback voltage sampling resistor is shorted or not only after the chip finishes its start-up. Once a shorted sampling resistor is detected, the output of the chip is turned off. As for the traditional switching power supply, when the upper voltage sampling resistor is shorted, the feedback voltage is so high that it exceeds the allowable voltage, the protection action is activated and the output of the chip is turned off; and when the lower voltage sampling resistor is shorted, the voltage feedback signal includes no demagnetization signal or the voltage of the port VDD is too high, such that the protection action is activated and the output of the chip is turned off. FIG. 1 is a diagram illustrating the working waveforms of the traditional switching power supply when the sampling resistor is shorted. Once a shorted sampling resistor is detected, the signal FB_SHORT is set to be a high level and latched, and the output of the chip is turned off to make the voltage of the port VDD be reduced to the minimum allowed. The chip is then reset, all states are cleared, and the chip is restarted. After the chip finishes its start-up, it is detected whether the voltage sampling resistor is shorted or not once again. Once a shorted sampling resistor is detected, the working process above is repeated.

The working mode above can realize turning off the output of the chip when the voltage sampling resistor is shorted, thereby protecting the chip, but through this protection manner, a short-circuit of the voltage sampling resistor can be detected only after a certain number of cycles of the switching operation, and thereby activating a protection action. As shown in FIG. 2, when the upper voltage sampling resistor is shorted, once the switching transistor is turned on, the current from the port FB will be so large that it will burn the ESD connected with the voltage feedback port FB and damage the chip. When the upper voltage sampling resistor is shorted, the current from the voltage feedback port FB is $$I = \frac{N_P}{N_A} * Ipeak,$$

wherein Ipeak is the maximum current of the primary side when the switching transistor is on. For example, when Ipeak=600 mA, and $N_P/N_A=17$, the current is 10.2 A, and there is a risk of burning the ESD connected with the port FB.

Through this protection manner, a short-circuit of the voltage sampling resistor can be detected only after the chip finishes its start-up and after a certain number of cycles of switching operation, as a result, the input power is relatively larger.

SUMMARY

The present disclosure aims at overcoming the defects in the prior art, and providing a short-circuit protection circuit for a voltage sampling resistor of a primary side converter, which can detect whether the voltage sampling resistor is shorted or not before the chip finishes its start-up, thereby avoiding the risk of damaging the chip by large current from the voltage feedback port due to turn-on of the switching transistor when the upper voltage sampling resistor is shorted. Simultaneously, the start-up is not finished, therefore, no outputs of the chip are generated, and the input power is reduced effectively in case of a shorted upper voltage sampling resistor.

The objectives of the present disclosure are achieved by the following technical schemes:

A short-circuit protection circuit for voltage sampling resistor of a primary side converter comprises a high voltage power transistor, a high voltage starting resistor, a first voltage dividing resistor of the port VDD, a second voltage dividing resistor of the port VDD, an NMOS transistor, a diode, a first comparator, a second comparator, a third comparator, a time delay circuit, a filter, a first logic circuit, a second logic circuit, a current supply, a first AND gate and a first inverter; the high voltage power transistor is electrically connected with a high voltage starting port SW, the power supply port VDD, the high voltage starting resistor, the diode, and the NMOS transistor respectively; the first comparator is electrically connected with the first voltage dividing resistor of the port VDD, the second voltage dividing resistor of the port VDD, the first logic circuit, the second logic circuit and the second comparator respectively; the second comparator is electrically connected with the first logic circuit, the second logic circuit and the time delay circuit respectively; the third comparator is electrically connected with the current supply, a voltage feedback port and the first inverter respectively; the second logic circuit is electrically connected with the time delay circuit and the first AND gate respectively; the first logic circuit is electrically connected with the NMOS transistor and the first AND gate respectively; the first inverter is electrically connected with the filter; the filter is electrically connected with the time delay circuit and the first AND gate respectively.

Further, in the short-circuit protection circuit above, the second logic circuit comprises a trigger DFF, a second inverter and a second AND gate; the second inverter is electrically connected with the second AND gate and the trigger DFF, and the second AND gate is electrically connected with the trigger DFF.

Further, in the short-circuit protection circuit above, the first logic circuit comprises a third inverter, a third AND gate, a first NAND Gate and a second NAND gate; the first NAND gate is electrically connected with the second NAND gate and the third AND gate respectively; the third AND gate is electrically connected with the third inverter.

Further, in the short-circuit protection circuit above, the first comparator is configured to compare a divided voltage VDD_R of the port VDD, which is divided by the first voltage dividing resistor of the port VDD and the second voltage dividing resistor of the port VDD, with a reference value Vref1 and a reference value Vref2 in real time, so as to generate a control signal VDD_Ctrl2; when the control signal VDD_Ctrl2 is a low level, the reference value of the first comparator is the reference value Vref2; and when the control signal VDD_Ctrl2 is a high level, the reference value of the first comparator is the reference value Vref1; when the divided voltage VDD_R of the port VDD, which is divided by the first voltage dividing resistor of the port VDD and the second voltage dividing resistor of the port VDD, is greater than the reference value Vref2, an output signal VDD_Ctrl2 of the first comparator is set to be a high level; when the divided voltage VDD_R of the port VDD, which is divided by the first voltage dividing resistor of the port VDD and the second voltage dividing resistor of the port VDD, is less than the reference value Vref1, the output signal VDD_Ctrl2 of the first comparator is set to be a low level; the control signal VDD_Ctrl2 generated by the first comparator controls the first logic circuit and the second logic circuit; the second comparator is configured to compare the divided voltage VDD_R of the port VDD, which is divided by the first voltage dividing resistor of the port VDD and the second voltage dividing resistor of the port VDD, with a reference value Vref3 and a reference value Vref4, so as to generate a control signal VDD_Ctrl1; when the control signal VDD_Ctrl1 is a low level, the reference value of the second comparator is the reference value Vref4; and when the control signal VDD_Ctrl1 is a high level, the reference value of the second comparator is the reference value Vref3; when the divided voltage VDD_R of the port VDD, which is divided by the first voltage dividing resistor of the port VDD and the second voltage dividing resistor of the port VDD, is greater than the reference value Vref4, the output signal VDD_Ctrl1 of the second comparator is set to be a high level; when the divided voltage VDD_R of the port VDD, which is divided by the first voltage dividing resistor of the port VDD and the second voltage dividing resistor of the port VDD, is less than the reference value Vref3, the output signal VDD_Ctrl1 of the second comparator is set to be a low level; the control signal VDD_Ctrl1 generated by the second comparator controls the second logic circuit and the time delay circuit, wherein, Vref2>Vref4>Vref1≥Vref3; the third comparator is configured to compare the voltage of the voltage feedback port FB with the reference value Vref5; when the voltage of the voltage feedback port FB is less than the reference value Vref5, the third comparator outputs a low level, otherwise, the third comparator outputs a high level; the second logic circuit is configured to generate a signal FB_Check_EN according to the control signal VDD_Ctrl1 and the control signal VDD_Ctrl2; when a rising edge of the control signal VDD_Ctrl1 arises, and when the control signal VDD_Ctrl2 is a low level, an output signal FB_Check_EN is set to be a high level; and when the control signal VDD_Ctrl2 is a high level, the output signal FB_Check_EN is set to be a low level; the signal FB_Check_EN is an enabling signal for detecting whether the voltage sampling resistor is shorted; if the signal FB_Check_EN is a high level, a chip is allowed to detect whether the voltage sampling resistor is shorted, otherwise, the detecting of the chip is shielded; the first logic circuit is configured to generate a signal HV_Ctrl according to the control signal VDD_Ctrl2 and the output signal FB_Short, which is output by the AND gate through performing logic AND operation between the signal FB_Check_EN and an output signal of the filter; when the control signal VDD_Ctrl2 is a high level, the output signal HV_Ctrl of the first logic circuit is set to be a high level; when the control signal VDD_Ctrl2 is a low level and the signal FB_Short is a high level, the output signal HV_Ctrl is set to be a high level; otherwise, the output signal HV_Ctrl is set to be a low level.

Further, in the short-circuit protection circuit above, a signal FB_Check_EN is configured to control the current supply to supply current or not; when the signal FB_Check_EN is a high level, the current supply supplies constant current for the voltage feedback port to detect whether the voltage sampling resistor is shorted or not; when the voltage sampling resistor is not shorted, the electric potential of the voltage feedback port is greater than Vref5 and the third comparator outputs a high level; otherwise, the third comparator outputs a low level, thereby detecting whether the voltage sampling resistor is shorted or not; when the signal FB_Check_EN is a low level, the current supply is prohibited from outputting current, namely, the chip is prohibited to detect whether the voltage sampling resistor is shorted or not.

Further, in the short-circuit protection circuit above, the filter is configured to start to detect whether output of the first inverter is a high level or not after the time delay circuit outputs a high level; if the output of the first inverter is a high level, namely, the voltage sampling resistor is shorted, the filter outputs a high level, otherwise, the filter outputs a low level; after a control signal VDD_Ctrl1 jumps from a low level to a high level, the output of the time delay circuit is set to be a high level; when the control signal VDD_Ctrl1 jumps from a high level to a low level, the output of the time delay circuit is set to be a low level.

Further, in the short-circuit protection circuit above, when the high voltage power transistor is on, capacitor of the port VDD is charged with large fixed current, so as to realize a swift start-up; when the high voltage power transistor is off, the capacitor of the port VDD is forbidden to be charged through the high voltage starting port; according to the control signal HV_Ctrl, the NMOS transistor controls the high voltage power transistor to be on or off; when the signal HV_Ctrl is a high level, the gate of the high voltage power transistor is pulled down to turn off the high voltage power transistor; otherwise, the high voltage power transistor is turned on; the resistance of the high voltage starting resistor is relatively larger, which enables the NMOS transistor to realize low power consumption with small current leakage when the NMOS transistor is on.

Further, in the short-circuit protection circuit above, the high voltage power transistor is a VDMOS transistor, an LDMOS transistor or a CoolMOS transistor.

The substantive features and notable progresses of the present disclosure are as follows:

The present disclosure is featured with a novel design, and is capable of correctly and effectively detecting whether the sampling resistor is shorted or not before the chip works normally, thereby avoiding the risk of damaging the chip by large current from the voltage feedback port FB due to turn-on of the switching transistor when the upper voltage sampling resistor is shorted. Additionally, when the sampling resistor is shorted, as the chip is not allowed to finish its normal start-up, no outputs of the chip are generated, which greatly reduces the input power in case of a shorted sampling resistor. The power supply system adopting the chip of the present disclosure can safely and effectively detect whether the sampling resistor is shorted or not; once a shorted sampling resistor is detected, the high voltage start-up circuit is turned off so as to power off the port VDD and restart the chip.

BRIEF DESCRIPTION OF THE DRAWINGS

For a more complete understanding, reference is now made to the following description taken in conjunction with the accompanying Drawings in which.

DETAILED DESCRIPTION

The present disclosure will now be described in more details with reference to the accompanying figures and embodiments.

Figure 1:
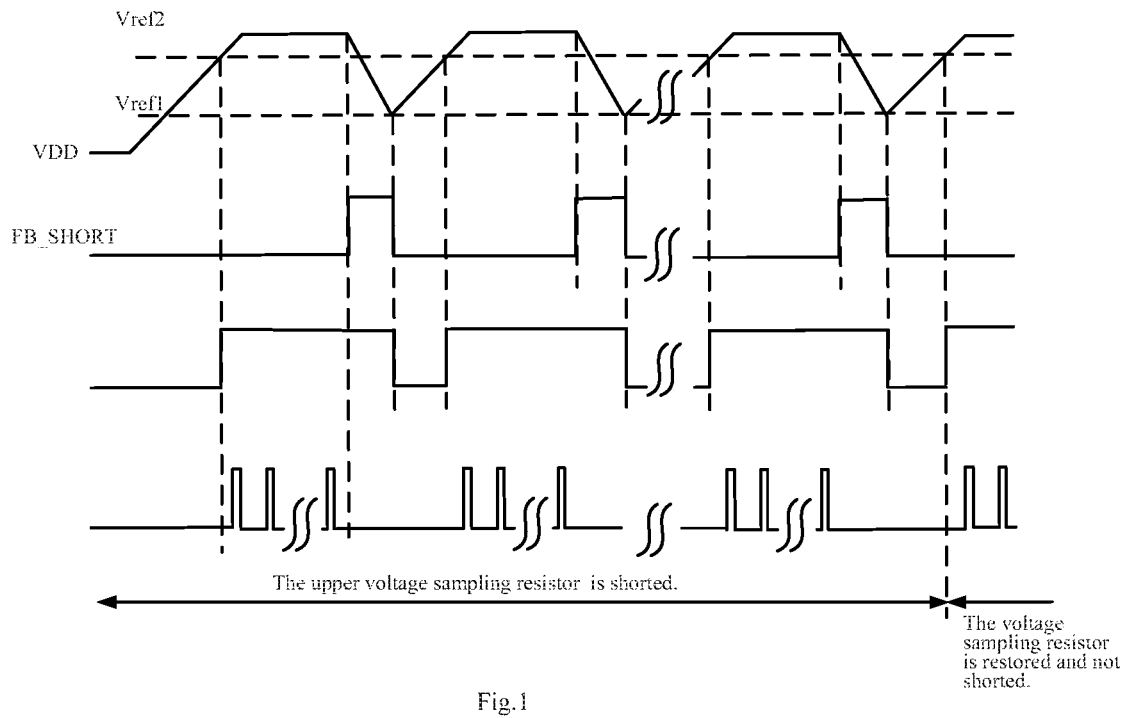
FIG. 1 is a diagram illustrating the working waveforms of the short-circuit protection circuit for a voltage sampling resistor in the prior art.
Figure 2:
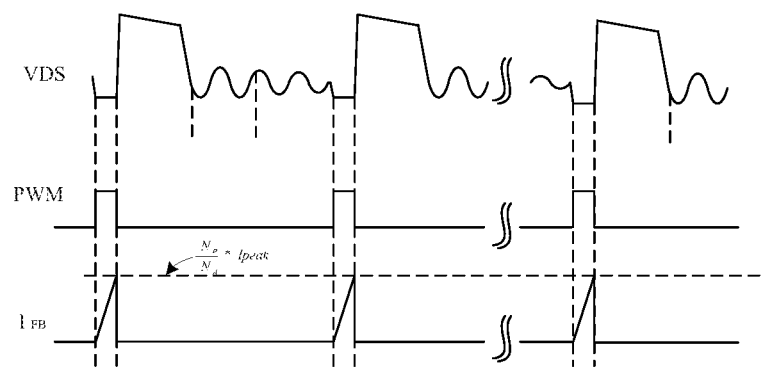
FIG. 2 is a schematic diagram illustrating the waveforms of the current from the voltage feedback port when the upper voltage sampling resistor is shorted in the prior art.
Figure 3:
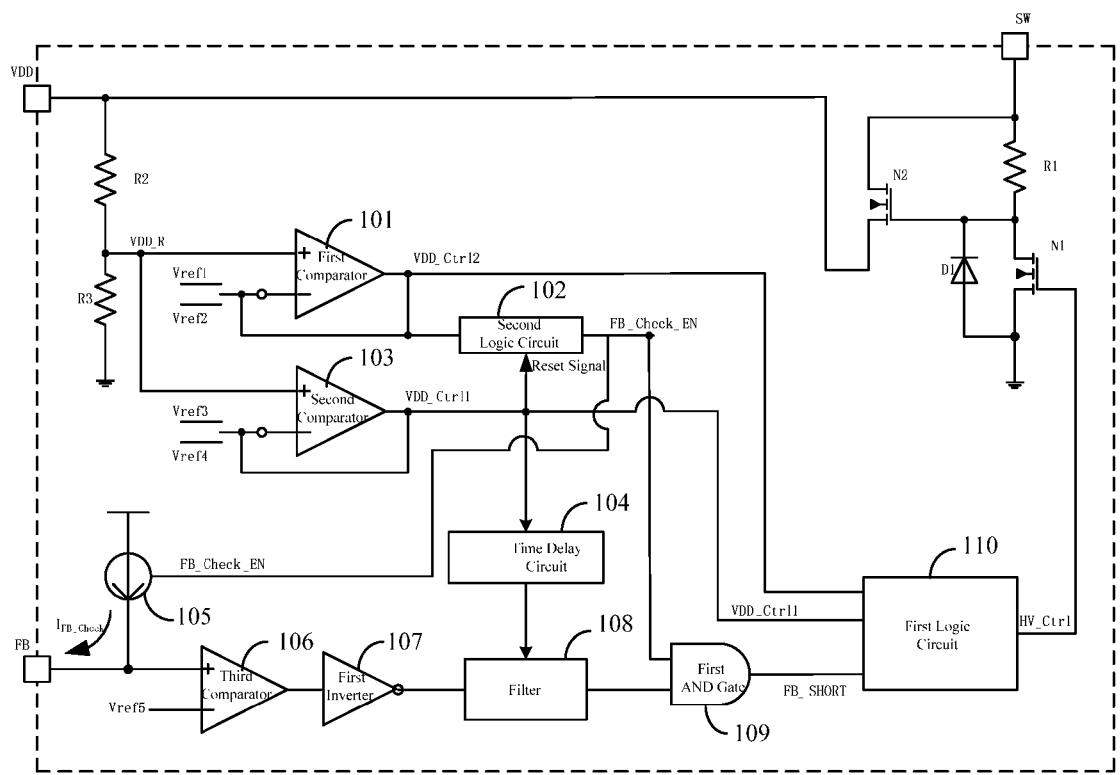
FIG. 3 is a schematic diagram illustrating the short-circuit protection circuit for a voltage sampling resistor of a primary side converter of the present disclosure.

As shown in FIG. 3, the short-circuit protection circuit for the voltage sampling resistor of the primary side converter comprises a high voltage power transistor N2, a high voltage starting resistor R1, a first voltage dividing resistor R2 of the port VDD, a second voltage dividing resistor R3 of the port VDD, an NMOS transistor N1, a diode D1, a first comparator 101, a second comparator 103, a third comparator 106, a time delay circuit 104, a filter 108, a first logic circuit 110, a second logic circuit 102, a current supply 105, a first AND gate 109 for performing the logical AND operation between an enabling signal FB_Check_EN for detecting whether the voltage sampling resistor is shorted and the output of the filter, and a first inverter 107 for inverting the output of the third comparator.

The high voltage power transistor N2 is electrically connected with the high voltage starting port SW, the power supply port VDD, the high voltage starting resistor R1, the diode D1, the NMOS transistor N1 respectively.

The first comparator 101 is electrically connected with the first voltage dividing resistor R2 of the port VDD, the second voltage dividing resistor R3 of the port VDD, the first logic circuit 110, the second logic circuit 102 and the second comparator 103 respectively.

The second comparator 103 is electrically connected with the first logic circuit 110, the second logic circuit 102 and the time delay circuit 104 respectively.

The third comparator 106 is electrically connected with the current supply 105, the voltage feedback port FB and the first inverter 107 respectively.

The second logic circuit 102 is electrically connected with the time delay circuit 104 and the first AND gate 109 respectively.

The first logic circuit 110 is electrically connected with the NMOS transistor N1 and the first AND gate 109 respectively.

The first inverter 107 is electrically connected with the filter 108.

The filter 108 is electrically connected with the time delay circuit 104 and the first AND gate 109 respectively.

Wherein, the high voltage power transistor N2 is a VDMOS transistor, an LDMOS transistor or a CoolMOS transistor.

The first comparator 101 compares the divided voltage VDD_R of the port VDD, which is divided by the first voltage dividing resistor R2 of the port VDD and the second voltage dividing resistor R3 of the port VDD, with the reference value Vref1 and the reference value Vref2, so as to generate a control signal VDD_Ctrl2. When the control signal VDD_Ctrl2 is a low level, the reference value of the first comparator 101 is the reference value Vref2; and when the control signal VDD_Ctrl2 is a high level, the reference value of the first comparator 101 is the reference value Vref1. When the divided voltage VDD_R of the port VDD, which is divided by the first voltage dividing resistor R2 of the port VDD and the second voltage dividing resistor R3 of the port VDD, is greater than the reference value Vref2, the output signal VDD_Ctrl2 of the first comparator 101 is set to be a high level. When the divided voltage VDD_R of the port VDD, which is divided by the first voltage dividing resistor R2 of the port VDD and the second voltage dividing resistor R3 of the port VDD, is less than the reference value Vref1, the output signal VDD_Ctrl2 of the first comparator 101 is set to be a low level. The control signal VDD_Ctrl2 generated by the first comparator 101 controls the first logic circuit 110 and the second logic circuit 102.

The second comparator 103 compares the divided voltage VDD_R of the port VDD, which is divided by the first voltage dividing resistor R2 of the port VDD and the second voltage dividing resistor R3 of the port VDD, with the reference value Vref3 and the reference value Vref4, so as to generate a control signal VDD_Ctrl1. When the control signal VDD_Ctrl1 is a low level, the reference value of the second comparator 103 is the reference value Vref4; and when the control signal VDD_Ctrl1 is a high level, the reference value of the second comparator 103 is the reference value Vref3. When the divided voltage VDD_R of the port VDD, which is divided by the first voltage dividing resistor R2 of the port VDD and the second voltage dividing resistor R3 of the port VDD, is greater than the reference value Vref4, the output signal VDD_Ctrl1 of the second comparator 103 is set to be a high level. When the divided voltage VDD_R of the port VDD, which is divided by the first voltage dividing resistor R2 of the port VDD and the second voltage dividing resistor R3 of the port VDD, is less than the reference value Vref3, the output signal VDD_Ctrl1 of the second comparator 103 is set to be a low level. The control signal VDD_Ctrl1 generated by the second comparator 103 controls the second logic circuit 102 and the time delay circuit 104, wherein, Vref2>Vref4>Vref1≥Vref3.

The third comparator 106 compares the voltage of the voltage feedback port FB with the reference value Vref5. When the voltage of the voltage feedback port FB is less than the reference value Vref5, the third comparator 106 outputs a low level, otherwise, the third comparator 106 outputs a high level.

The second logic circuit 102 generates a signal FB_Check_EN according to the control signal VDD_Ctrl1 and the control signal VDD_Ctrl2. When a rising edge of the control signal VDD_Ctrl1 arises, and when the control signal VDD_Ctrl2 is a low level, the output signal FB_Check_EN is set to be a high level; and when the control signal VDD_Ctrl2 is a high level, the output signal FB_Check_EN is set to be a low level. The signal FB_Check_EN is an enabling signal for detecting whether the voltage sampling resistor is shorted. If the signal FB_Check_EN is a high level, the chip is allowed to detect whether the voltage sampling resistor is shorted, otherwise, the detecting of the chip is shielded.

The first logic circuit 110 generates a signal HV_Ctrl according to the control signal VDD_Ctrl2 and the output signal FB_Short, which is output by the AND gate through performing the logic AND operation between the signal FB_Check_EN and the output signal of the filter. When the control signal VDD_Ctrl2 is a high level, the output signal HV_Ctrl of the first logic circuit 110 is set to be a high level. When the control signal VDD_Ctrl2 is a low level and the signal FB_Short is a high level, the output signal HV_Ctrl is set to be a high level; otherwise, the output signal HV_Ctrl is set to be a low level.

The signal FB_Check_EN controls the current supply 105 to supply current or not. When the signal FB_Check_EN is a high level, the current supply 105 supplies constant current for the voltage feedback port FB to detect whether the voltage sampling resistor is shorted or not. When the voltage sampling resistor is not shorted, the electric potential of the voltage feedback port FB is greater than Vref5, and the third comparator 106 outputs a high level; otherwise, the third comparator 106 outputs a low level, thereby detecting whether the voltage sampling resistor is shorted or not. When the signal FB_Check_EN is a low level, the current supply 105 is prohibited outputting current, namely, the chip is prohibited to detect whether the voltage sampling resistor is shorted or not.

After the time delay circuit 104 outputs a high level, the filter 108 starts to detect whether the output of the first inverter 107 is a high level or not. If the output of the first inverter 107 is a high level (namely, the voltage sampling resistor of the system is shorted), and after the high level remains for a period of time, the filter 108 outputs a high level, otherwise, the filter 108 outputs a low level. After the control signal VDD_Ctrl1 jumps from a low level to a high level for a period of time, the output of the time delay circuit 104 is set to be a high level; when the control signal VDD_Ctrl1 jumps from a high level to a low level, the output of the time delay circuit 104 is set to be a low level immediately.

The first inverter 107 reverses the output of the third comparator 106, and the output of the third comparator 106 represents whether the sampling resistor is shorted or not.

When the high voltage power transistor N2 is on, the capacitor of the port VDD is charged by large constant current, so as to realize a swift start-up. When the high voltage power transistor N2 is off, the capacitor of the port VDD is forbidden to be charged through the high voltage starting port SW. According to the control signal HV_Ctrl, the NMOS transistor N1 controls the high voltage power transistor N2 to be on or off. When the signal HV_Ctrl is a high level, the gate of the high voltage power transistor N2 is pulled down to turn off the high voltage power transistor N2; otherwise, the high voltage power transistor N2 is turned on. The resistance of the high voltage starting resistor R1 is relative larger, which enables the conducting NMOS transistor N1 to realize low power consumption with small leakage current.

Figure 4:
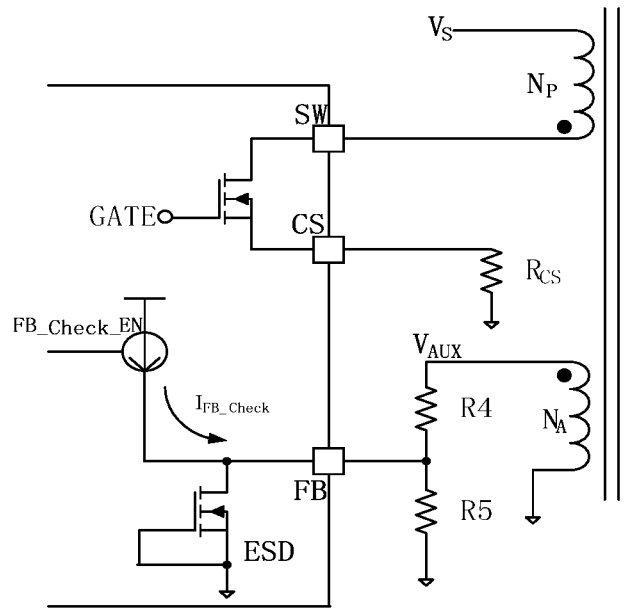
FIG. 4 is a circuit construction schematic diagram of a system adopting a power chip of the present disclosure.

The initial state of the high voltage power transistor N2 is on. After the system is energized, the SW port of the chip charges the capacity of the power port VDD through the high voltage power transistor N2, and the chip detects the electric potential of the port VDD in real time. When VDD_R is greater than Vref4, the chip is enabled to detect whether the sampling resistor is shorted or not (namely, the signal FB_Check_EN is set to be a high level). As shown FIG. 4, the chip outputs constant current $I_{FB\_Check}$ to the voltage feedback port FB, the electric potential of the voltage feedback port FB is $$V_{FB} = I_{FB\_Check} \times \frac{R4 \times R5}{R4 + R5}.$$

When either the voltage sampling resistor R4 or the voltage sampling resistor R5 of the system is shorted, then $V_{FB}=0V$, namely, $V_{FB}$ is smaller than the reference value Vref5, and the third comparator outputs a low level, so as to control the high voltage power transistor N2 to be off, disabling the chip to start normally. When neither of the voltage sampling resistors R4 and R5 of the system is shorted, $V_{FB}$ is greater than the reference value Vref5, and the third comparator outputs a high level, permitting the capacitor of the port VDD to be charged through the high voltage starting port SW, and the start-up of the chip continues. When VDD_R is greater than Vref2, the function of detecting whether the sampling resistor is shorted or not is disabled, and the chip goes into normal working mode. After the high voltage power transistor N2 is turned off due to the short-circuit of the sampling resistor, as the current supply outputs current all the time, the electric potential VDD_R falls below Vref1 rapidly, and the high voltage power transistor N2 is turned on again, and the chip enables the function of detecting whether the sampling resistor is shorted or not. Again and again, till the sampling resistor is not shorted any longer and the chip finishes the normal start-up, the chip goes into the normal working mode. After the chip goes into the normal working mode, it is not allowed to detect whether the sampling resistor is shorted or not.

Figure 5:
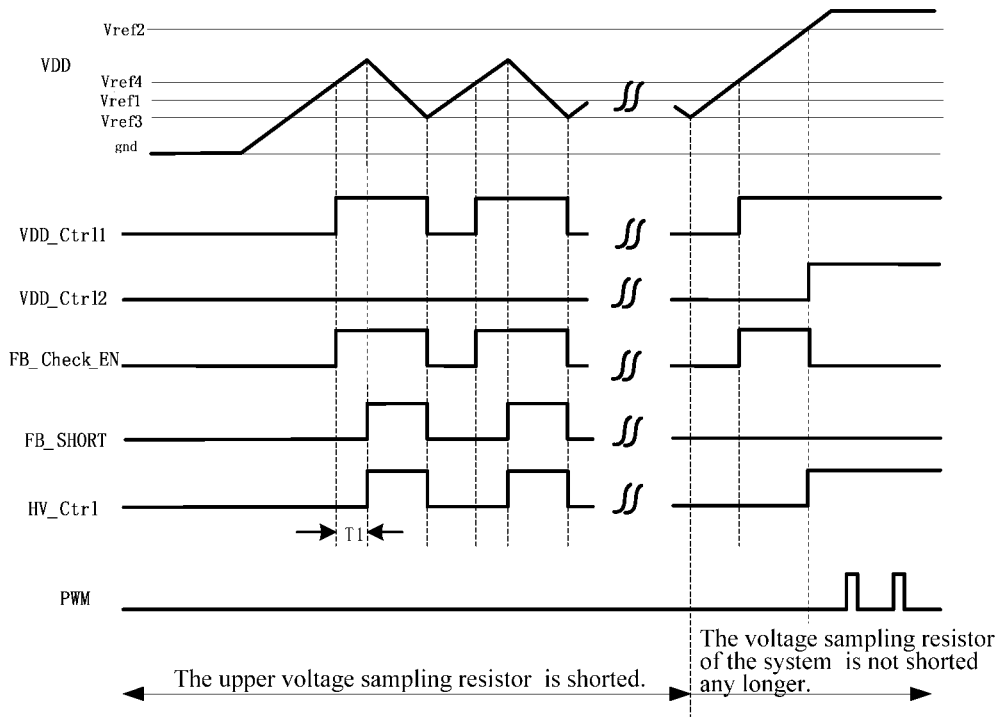
FIG. 5 is a diagram illustrating working waveforms of the power chip of the present disclosure when the voltage sampling resistor is shorted.

FIG. 5 is a diagram illustrating the working waveforms of the power chip of the present disclosure. When a short-circuit of the voltage sampling resistor of the system is detected, turn off the high voltage start-up circuit, let the electric potential VDD_R fall below Vref3, reset the chip, restart the high voltage start-up circuit, and continue to charge the capacitor of the port VDD till the short-circuit state of the voltage sampling resistor is eliminated. In such detecting and protecting mode, no outputs of the chip are generated, so the input power is smaller in case of a short-circuit of the voltage sampling resistor. No outputs of the chip are generated, so there is no large current flowing to the voltage feedback port FB when the upper voltage sampling resistor is shorted, avoiding damaging the ESD at the voltage feedback port FB, thereby detecting whether the voltage sampling resistor is shorted safely and effectively.

Figure 6:
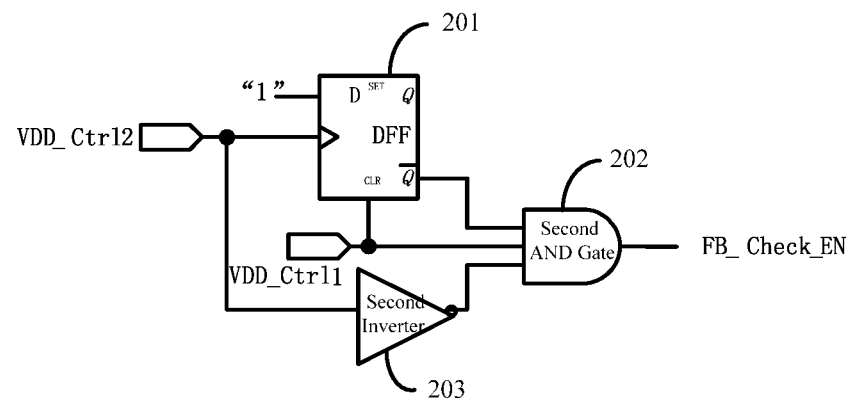
FIG. 6 is a schematic diagram illustrating a second logic circuit of the present disclosure.

FIG. 6 is a schematic diagram illustrating the second logic circuit of the short-circuit protection circuit for voltage sampling resistor of primary side converter of the present disclosure. The second logic circuit 102 comprises a trigger DFF 201, a second inverter 203 and a second AND gate 202. The second inverter 203 is electrically connected with the second AND gate 202 and the trigger DFF 201, and the second AND gate 202 is electrically connected with the trigger DFF 201. The second logic circuit 102 generates a signal FB_Check_EN according to the control signals VDD_Ctrl1 and VDD_Ctrl2. When a rising edge of the control signal VDD_Ctrl1 arises and the control signal VDD_Ctrl2 is a low level, the output signal FB_Check_EN is set to be a high level; when the control signal VDD_Ctrl2 is a high level, the output signal FB_Check_EN is set to be a low level. The signal FB_Check_EN is an enabling signal for the function of detecting whether the sampling resistor is shorted. When the signal FB_Check_EN is a high level, the chip is enabled to detect whether the sampling resistor is shorted or not, otherwise, the function is shielded.

Figure 7:
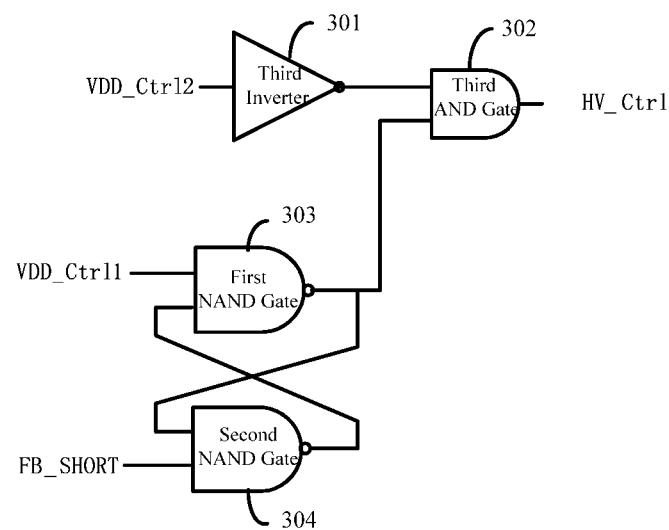
FIG. 7 is a schematic diagram illustrating a first logic circuit of the present disclosure.

FIG. 7 is a schematic diagram illustrating the first logic circuit of the short-circuit protection circuit for voltage sampling resistor of primary side converter of the present disclosure. The first logic circuit 110 comprises a third inverter 301, a third AND gate 302, a first NAND gate 303 and a second NAND gate 304. The first NAND gate 303 is electrically connected with the second NAND gate 304 and the third AND gate 302 respectively. The third AND gate 302 is electrically connected with the third inverter 301. The first logic circuit 110 generates a signal HV_Ctrl according to the control signal VDD_Ctrl2, and the output signal FB_Short output by the AND gate through performing logic AND operation between the signal FB_Check_EN and the output signal of the filter. When the control signal VDD_Ctrl2 is a high level, the output signal HV_Ctrl of the first logic circuit 110 is set to be a high level. When the control signal VDD_Ctrl2 is a low level and the signal FB_Short is a high level, the output signal HV_Ctrl is set to be a high level; otherwise, the output signal HV_Ctrl is set to be a low level.

As summarized from what described above, the chip of the present disclosure is capable of correctly and effectively detecting whether the sampling resistor is shorted or not before the chip works normally, thereby avoiding the risk of damaging the chip by large current from the voltage feedback port FB due to turn-on of the switching transistor when the upper voltage sampling resistor is shorted. Additionally, when the sampling resistor is shorted, as the chip is not allowed to finish its normal start-up, no outputs of the chip are generated, which greatly reduces the input power in case of a short-circuit of the voltage sampling resistor. The power supply system adopting the chip of the present disclosure can correctly and effectively detect whether the sampling resistor is shorted or not. Once a shorted sampling resistor is detected, the high voltage start-up circuit is turned off to power off the port VDD and to restart the chip.

It should be understood by those skilled in the art that the present disclosure is not restricted to the preferred embodiments, and that various modifications or improvement may be made based on the principles of the present disclosure without departing from the scope of the present disclosure. All of these modifications and improvements fall within the scope of the present invention.

What is claimed is:

1. A short-circuit protection circuit for a voltage sampling resistor of a primary side converter, comprising:
   a high voltage power transistor electrically connected with a high voltage starting port, a power supply port, a high voltage starting resistor, a diode, and an NMOS transistor;
   a first voltage dividing resistor of the power supply port;
   a second voltage dividing resistor of the power supply port;
   a first comparator electrically connected with the first voltage dividing resistor, the second voltage dividing resistor, a first logic circuit, a second logic circuit, and a second comparator;
   the second comparator electrically connected with the first logic circuit, the second logic circuit, and a time delay circuit;
   a third comparator electrically connected with a current supply, a voltage feedback port, and a first inverter;
   the second logic circuit electrically connected with the time delay circuit and a first AND gate;
   the first logic circuit electrically connected with the NMOS transistor and the first AND gate;
   the first inverter electrically connected with a filter; and
   the filter electrically connected with the time delay circuit and the first AND gate.

2. The short-circuit protection circuit of claim 1, wherein the second logic circuit includes a trigger DFF, a second inverter, and a second AND gate.

3. The short-circuit protection circuit of claim 2, wherein the second inverter is electrically connected with the second AND gate and the trigger DFF, and the second AND gate is electrically connected with the trigger DFF.

4. The short-circuit protection circuit of claim 1, wherein the first logic circuit includes a third inverter, a third AND gate, a first NAND gate, and a second NAND gate.

5. The short-circuit protection circuit of claim 4, wherein the first NAND gate is electrically connected with the second NAND gate and the third AND gate, and the third AND gate is electrically connected with the third inverter.

6. The short-circuit protection circuit of claim 1, wherein the first comparator is configured to compare a divided voltage of the power supply port, which is divided by the first voltage dividing resistor of the power supply port and the second voltage dividing resistor of the power supply port, with a reference value Vref1 and a reference value Vref2 in real time, so as to generate a control signal VDD_Ctrl2, wherein when the control signal VDD_Ctrl2 is a low level, the reference value of the first comparator is the reference value Vref2, and when the control signal VDD_Ctrl2 is a high level, the reference value of the first comparator is the reference value Vref1.

7. The short-circuit protection circuit of claim 6, wherein when the divided voltage of the power supply port is greater than the reference value Vref2, an output signal of the first comparator is set to be a high level, and when the divided voltage of the power supply port is less than the reference value Vref1, the output signal of the first comparator is set to be a low level, and wherein the control signal VDD_Ctrl2 generated by the first comparator controls the first logic circuit and the second logic circuit.

8. The short-circuit protection circuit of claim 7, wherein the second comparator is configured to compare the divided voltage of the power supply port with a reference value Vref3 and a reference value Vref4, so as to generate a control signal VDD_Ctrl1, wherein when the control signal VDD_Ctrl1 is a low level, the reference value of the second comparator is the reference value Vref4, and when the control signal VDD_Ctrl1 is a high level, the reference value of the second comparator is the reference value Vref3.

9. The short-circuit protection circuit of claim 8, wherein when the divided voltage of the power supply port is greater than the reference value Vref4, the output signal of the second comparator is set to be a high level, and when the divided voltage of the power supply port is less than the reference value Vref3, the output signal of the second comparator is set to be a low level, and wherein the control signal VDD_Ctrl1 generated by the second comparator controls the second logic circuit and the time delay circuit, wherein, Vref2>Vref4>Vref1≥Vref3.

10. The short-circuit protection circuit of claim 9, wherein the third comparator is configured to compare the voltage of the voltage feedback port with the reference value Vref5, and when the voltage of the voltage feedback port is less than the reference value Vref5, the third comparator outputs a low level, otherwise, the third comparator outputs a high level, and wherein the second logic circuit is configured to generate an output signal FB_Check_EN according to the control signal VDD_Ctrl1 and the control signal VDD_Ctrl2, and when a rising edge of the control signal VDD_Ctrl1 arises, and when the control signal VDD_Ctrl2 is a low level, the output signal FB_Check_EN is set to be a high level.

11. The short-circuit protection circuit of claim 10, wherein when the control signal VDD_Ctrl2 is a high level, the output signal FB_Check_EN is set to be a low level, wherein the output signal FB_Check_EN is an enabling signal for detecting whether the voltage sampling resistor is shorted, wherein if the output signal FB_Check_EN is a high level, a chip is allowed to detect whether the voltage sampling resistor is shorted, otherwise, the detecting of the chip is shielded.

12. The short-circuit protection circuit of claim 11, wherein the first logic circuit is configured to generate a signal HV_Ctrl according to the control signal VDD_Ctrl2 and an output signal FB_Short, which is output by the AND gate through performing a logic AND operation between the output signal FB_Check_EN and an output signal of the filter, and when the control signal VDD_Ctrl2 is a high level, the output signal HV_Ctrl of the first logic circuit is set to be a high level, and when the control signal VDD_Ctrl2 is a low level and the signal FB_Short is a high level, the output signal HV_Ctrl is set to be a high level, and, otherwise, the output signal HV_Ctrl is set to be a low level.

13. The short-circuit protection circuit of claim 1, wherein a signal is configured to control the current supply to supply current or not, and when the signal is a high level, the current supply supplies constant current for the voltage feedback port to detect whether the voltage sampling resistor is shorted or not.

14. The short-circuit protection circuit of claim 13, wherein when the voltage sampling resistor is not shorted, the electric potential of the voltage feedback port is greater than a reference value and the third comparator outputs a high level, and, otherwise, the third comparator outputs a low level, thereby detecting whether the voltage sampling resistor is shorted or not.

15. The short-circuit protection circuit of claim 14, wherein when the signal is a low level, the current supply is prohibited from outputting current, so that the chip can detect whether the voltage sampling resistor is shorted or not.

16. The short-circuit protection circuit of claim 1, wherein the filter is configured to start to detect whether output of the first inverter is a high level or not after the time delay circuit outputs a high level, and, if the output of the first inverter is a high level, the filter outputs a high level, and, otherwise, the filter outputs a low level.

17. The short-circuit protection circuit of claim 16, wherein after a control signal jumps from a low level to a high level, the output of the time delay circuit is set to be a high level, and when the control signal jumps from a high level to a low level, the output of the time delay circuit is set to be a low level.

18. The short-circuit protection circuit of claim 1, wherein when the high voltage power transistor is on, a capacitor of the power supply port is charged with a large constant current, so as to realize a swift start-up, and when the high voltage power transistor is off, the capacitor of the power supply port is forbidden to be charged through the high voltage starting port.

19. The short-circuit protection circuit of claim 18, wherein the NMOS transistor controls the high voltage power transistor to be on or off according to a control signal, and when the control signal is a high level, a gate of the high voltage power transistor is pulled down to turn off the high voltage power transistor, and, otherwise, to turn on the high voltage power transistor, and wherein the resistance of the high voltage starting resistor is larger, which enables the NMOS transistor to realize low power consumption with small current leakage when the NMOS transistor is on.

20. The short-circuit protection circuit of claim 1, wherein, the high voltage power transistor is a VDMOS transistor, an LDMOS transistor, or a CoolMOS transistor.

* * * * *